US008466094B2

(12) United States Patent
Kakadjian et al.

(10) Patent No.: US 8,466,094 B2
(45) Date of Patent: Jun. 18, 2013

(54) AGGREGATING COMPOSITIONS, MODIFIED PARTICULATE METAL-OXIDES, MODIFIED FORMATION SURFACES, AND METHODS FOR MAKING AND USING SAME

(75) Inventors: Sarkis R. Kakadjian, San Antonio, TX (US); Raynard Veldman, Bellaire, TX (US); Frank Zamora, San Antonio, TX (US); Erin Fitzgerald, San Antonio, TX (US); Tina Garza, San Antonio, TX (US)

(73) Assignee: Clearwater International, LLC, Houston, TX (US)

( * ) Notice: Subject to any disclaimer, the term of this patent is extended or adjusted under 35 U.S.C. 154(b) by 246 days.

(21) Appl. No.: 12/465,437

(22) Filed: May 13, 2009

(65) Prior Publication Data

US 2010/0292108 A1 Nov. 18, 2010

(51) Int. Cl.
*C09K 8/80* (2006.01)
(52) U.S. Cl.
USPC .......................................................... 507/229
(58) Field of Classification Search
None
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,040,967 A * | 8/1977 | Nimerick et al. | 507/211 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |

(Continued)

FOREIGN PATENT DOCUMENTS

| | | |
|---|---|---|
| CA | 2125513 | 1/1995 |
| DE | 4027300 | 5/1992 |

(Continued)

OTHER PUBLICATIONS

U.S. Appl. No. 12/750,335, filed Mar. 30, 2010, Parker.

(Continued)

*Primary Examiner* — Randy Gulakowski
*Assistant Examiner* — Jeffrey Washville
(74) *Attorney, Agent, or Firm* — Robert W Strozier

(57) ABSTRACT

A method for treating solid materials is disclosed, where the treating compositions coats surfaces or portions of surfaces of the solid materials changing an aggregation or agglomeration propensity of the materials. Treating composition and treated solid materials are also disclosed. The methods and treated materials are ideally suited for oil field applications.

22 Claims, 4 Drawing Sheets

U.S. PATENT DOCUMENTS

| | | | |
|---|---|---|---|
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffee et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,401 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,660,821 B2 | 12/2003 | Lee et al. | |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | |
| 7,566,686 B2 | 7/2009 | Kippie et al. | 507/213 |
| 7,712,535 B2 | 5/2010 | Venditto et al. | |
| 7,767,628 B2 | 8/2010 | Kippie et al. | 507/102 |
| 2002/0049256 A1 | 4/2002 | Bergeron, Jr. | 514/674 |
| 2002/0165308 A1 | 11/2002 | Kinniard et al. | 524/492 |
| 2003/0114315 A1* | 6/2003 | Schwartz et al. | 507/121 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0131425 A1* | 6/2007 | Gatlin et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0197085 A1 | 8/2008 | Wanner et al. | |
| 2008/0251252 A1 | 10/2008 | Schwartz | |
| 2008/0257553 A1 | 10/2008 | Gatlin et al. | 166/280.2 |
| 2008/0257554 A1 | 10/2008 | Zamora et al. | |
| 2008/0269082 A1 | 10/2008 | Wilson, Jr. et al. | |
| 2008/0283242 A1 | 11/2008 | Ekstrand et al. | |
| 2008/0287325 A1 | 11/2008 | Thompson et al. | |
| 2008/0314124 A1 | 12/2008 | Sweeney et al. | |
| 2008/0318812 A1 | 12/2008 | Kakadjian et al. | |
| 2009/0067931 A1 | 3/2009 | Curr et al. | |
| 2009/0151959 A1 | 6/2009 | Darnell et al. | |
| 2009/0200027 A1 | 8/2009 | Kakadjian et al. | |
| 2009/0200033 A1 | 8/2009 | Kakadjian et al. | |
| 2009/0203553 A1 | 8/2009 | Gatlin et al. | |
| 2009/0250659 A1 | 10/2009 | Gatlin | 208/236 |
| 2009/0275488 A1 | 11/2009 | Zamora et al. | |
| 2010/0000795 A1 | 1/2010 | Kippie et al. | |
| 2010/0012901 A1 | 1/2010 | Falana et al. | |
| 2010/0077938 A1 | 4/2010 | Zamora et al. | |
| 2010/0122815 A1 | 5/2010 | Zamora et al. | |
| 2010/0181071 A1 | 7/2010 | van Petegen | |
| 2010/0197968 A1 | 8/2010 | Falana et al. | |
| 2010/0212905 A1 | 8/2010 | van Petegen | |
| 2010/0252262 A1 | 10/2010 | Ekstrand et al. | |

FOREIGN PATENT DOCUMENTS

| | | |
|---|---|---|
| GB | 775376 | 10/1954 |
| GB | 1073338 A | 6/1967 |
| JP | 10001461 | 6/1988 |
| JP | 08151422 | 11/1996 |
| JP | 10110115 A | 4/1998 |
| JP | 2005194148 A | 7/2005 |
| WO | WO 98/56497 | 12/1998 |

OTHER PUBLICATIONS

U.S. Appl. No. 12/473,805, filed May 28, 2009, Falana et al.
U.S. Appl. No. 12/510,101, filed Jul. 27, 2009, Falana et al.
U.S. Appl. No. 12/479,486, filed Jun. 5, 2009, Kakadjian et al.
Austalian Examination Report.
Serhiy Malynych, Igor Luzinov, and George Chumanov, "Poly(Vinyl Pyridine) as a Universal Surface Modifier for Immobilization of Nanoparticles.", J. Phys. Chem. B, 2002, 106 (6), pp. 1280-1285.

* cited by examiner

AGGREGATING COMPOSITIONS, MODIFIED PARTICULATE METAL-OXIDES, MODIFIED FORMATION SURFACES, AND METHODS FOR MAKING AND USING SAME

BACKGROUND OF THE INVENTION

1. Field of the Invention

Embodiments of the present invention relate to compositions including aggregating agents for solid materials, substrates or surfaces, where the materials, substrates or surfaces include metal oxide or ceramic solid materials, substrates or surfaces (natural or synthetic), metallic solid materials, substrates or surfaces, polymeric or plastic solid materials, substrates or surfaces (natural or synthetic), solid plant materials, substrates or surfaces (natural or treated), or other types of solid materials, substrates or surfaces or formation surfaces, formation particulate, and formation fines and methods for making and using same.

More particularly, the present invention relate to compositions including aggregating agents for particulate solid materials or substrates, where the aggregating agents modify surface properties of solid surfaces and surfaces of particulate solid materials increasing their aggregating propensity or properties. The present invention also relates to coated or modified surfaces and/or particulate solid materials capable of self-aggregation or aggregating to a coated surface. The present invention also relates to methods for aggregating particulate solid materials and for aggregating particulate solid materials to treated solid surfaces, especially in downhole applications and in any other application where particulate metal oxide-containing solids aggregation is desirable. Embodiments of the present invention are ideally suitable for drilling, completion, fracturing or other oil/gas well operations, where particulate control is needed, enhanced production, reduced flow back, reduced water block in, enhanced load recovery, and changes in zeta potential or aggregation propensity of particulate.

2. Description of the Related Art

Historically the use of tacky-sticky materials within a particulate laden fluid whereby particulate flowback is reduced or prevented is dated back to 1998. U.S. Pat. No. 5,787,986 assignee to Halliburton shows mainly how the use of polyamides product mainly from the condensation of polyamines and di-acids is capable of decrease of substantially eliminates the flowback of particulates whether proppant or formation fines. U.S. Pat. No. 7,392,847 granted to Weatherford shows that the product of the reaction between a primary amine and a phosphate ester is capable of change the aggregation or agglomeration propensity of the materials.

In many situations, sand, particulate metal oxide-containing solids or other particulate materials or solid materials are difficult to consolidate in underground formations once placed due to their inability to aggregate or to cling to each other or to form aggregated masses that allow formation fluid flow back through the placed or pumped-in fluids without flowing solids back to the surface. In addition, other situations occur where formation sand flows due to formation unconsolidated characteristics, and the flowing sand is transported to the surface during well production.

Although several technologies now exist for tackifying such particulate solid with a tackifying agent, there is a need in the art of a different treating composition to cause such particulate solids to self-aggregate and to methods for making self-aggregating particulate solids.

SUMMARY OF THE INVENTION

Compositions

The present invention provides a particulate solid material such as a metal oxide-containing solid having improved self-aggregating properties. The improved self-aggregating or aggregation propensity of the particles derives from the surfaces of the particulate solids having a coating including a polymer including repeat units derived from vinyl monomers including a cyclic or aromatic nitrogen-containing ring or ring system or a polymer having repeat units derived from a heterocyclic or heterocyclic aromatic vinyl monomer, where the hetero atom is a nitrogen atom or a nitrogen atom and another hetero atoms selected from the group consisting of a boron atom, an oxygen atom, a phosphorus atom, a sulfur atom, and/or a germanium and optionally a reaction product of an amine and a phosphate-containing compound. The coating can also include a reaction product of an amine and a phosphate containing compound.

The present invention provides particulate solid material such as a metal oxide-containing solids having a coating including a polymer including repeat units derived from vinyl monomers including a cyclic or aromatic nitrogen-containing ring or ring system and optionally a reaction product of an amine and a phosphate containing compound, where the coating deforms under pressure and imparts an enhanced aggregating propensity to the solid particles.

The present invention provides an aggregated particulate solid material such as metal oxide-containing solid composition including a particulate metal oxide-containing solid coated with a polymer having repeat units derived from a heterocyclic or heterocyclic aromatic vinyl monomer, where the hetero atom is a nitrogen atom or a nitrogen atom and another hetero atoms selected from the group consisting of a boron atom, an oxygen atom, a phosphorus atom, a sulfur atom, and/or a germanium and optionally a reaction product of an amine and a phosphate-containing compound, where the coating is deformable.

The present invention provides a substrate having surfaces partially or completed coated with a composition of this invention comprising a polymer having repeat units derived from a heterocyclic or heterocyclic aromatic vinyl monomer, where the hetero atom is a nitrogen atom or a nitrogen atom and another hetero atoms selected from the group consisting of a boron atom, an oxygen atom, a phosphorus atom, a sulfur atom, and/or a germanium and optionally a reaction product of an amine and a phosphate-containing compound, where the coating is deformable and where the substrate is ideally suited for filtering fines and/or other particulate materials form a fluid, especially fluids used in oil/gas well drilling, completion, production, fracturing, propping, other production enhancing processes or other related applications. The structures can be ceramic or ceramic fibers or wools coated partially or completely with the compositions of this invention. Such structures are well suited for filter media to be used with or without screens.

Method for Treating

The present invention provides a method for changing an aggregation potential or propensity of a particulate solid material such as a metal oxide-containing solid, where the method includes the step of contacting the particulate solid material with a composition including a polymer having repeat units derived from a heterocyclic or heterocyclic aromatic vinyl monomer, where the hetero atom is a nitrogen atom or a nitrogen atom and another hetero atoms selected from the group consisting of a boron atom, an oxygen atom, a phosphorus atom, a sulfur atom, and/or a germanium and optionally a reaction product of an amine and a phosphate-containing compound under conditions sufficient for the amine and phosphate containing compound to react forming a coating composition capable of partially or completely coating solid surfaces.

Methods for Using the Treating Methods

Fracturing

The present invention provides a method for fracturing a formation including the step of pumping a fracturing fluid including a proppant into a producing formation at a pressure sufficient to fracture the formation and to enhance productivity, where the proppant props open the formation after fracturing and where the proppant comprises a particulate solid treated with a treating composition comprising a polymer including repeat units derived from vinyl monomers including a cyclic or aromatic nitrogen-containing ring or ring system and optionally a reaction product of an amine and a phosphate containing compound under conditions sufficient for the amine and phosphate containing compound to react forming a coating composition capable of partially or completely coating solid surfaces.

The present invention provides a method for fracturing a formation including the step of pumping a fracturing fluid including a proppant and an aggregating composition of this invention into a producing formation at a pressure sufficient to fracture the formation and to enhance productivity. The composition results in a modification of an aggregation propensity, and/or zeta-potential of the proppant, formation particles and formation surfaces so that the formation particles and/or proppant aggregate and/or cling to the formation surfaces.

The present invention provides a method for fracturing a formation including the step of pumping a fracturing fluid including an aggregating composition of this invention into a producing formation at a pressure sufficient to fracture the formation and to enhance productivity. The composition results in a modification of an aggregation propensity and/or zeta-potential of the formation particles and formation surfaces so that the formation particles aggregate and/or cling to the formation surfaces. The method can also include the step of pumping a proppant comprising a coated particulate solid composition of this invention after fracturing so that the coated particles prop open the fracture formation and tend to aggregate to the formation surfaces and/or formation particles formed during fracturing.

Drilling

The present invention provides a method for drilling including the step of while drilling, circulating a drilling fluid, to provide bit lubrication, heat removal and cutting removal, where the drilling fluid includes an aggregating composition of this invention. The composition increases an aggregation potential or propensity and/or alters a zeta potential of any particulate metal oxide-containing solid in the drilling fluid or that becomes entrained in the drilling fluid to increase solids removal. The method can be operated in over-pressure conditions or under-balanced conditions or under managed pressure conditions. The method is especially well tailored to under-balanced or managed pressure conditions.

The present invention provides a method for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition of this invention to provide bit lubrication, heat removal and cutting removal and to increase an aggregation potential or decrease the absolute value of the zeta potential of any particulate solids in the drilling fluid or that becomes entrained in the drilling fluid to increase solids removal. The method can be operated in over-pressure conditions or under-balanced conditions or under managed pressure conditions. The method is especially well tailored to under-balanced or managed pressure conditions.

The present invention provides a method for drilling including the step of while drilling, circulating a first drilling fluid to provide bit lubrication, heat removal and cutting removal. Upon encountering an underground structure that produces undesirable quantities of particulate solids, changing the first drilling fluid to a second drilling fluid including a composition of this invention to provide bit lubrication, heat removal and cutting removal and to increase an aggregation potential or decrease in the absolute value of the zeta potential of any particulate solids in the drilling fluid or that becomes entrained in the drilling fluid to increase solids removal. After passing through the structure that produces an undesired quantities of particulate solids, change the second drilling fluid to the first drilling fluid or a third drilling fluid. The method can be operated in over-pressure conditions or under-balanced conditions or under managed pressure conditions. The method is especially well tailored to under-balanced or managed pressure conditions.

The present invention provides a method for completion of a well including the step of treating the well with a fluid including a composition of this invention adapted to increase an aggregation potential or decrease in the absolute value of the zeta potential of particulate solids and fines and formation surfaces resulting in fine and sand migration and increasing productivity of the well especially gas productivity.

Producing

The present invention provides a method for producing including the step of circulating and/or pumping a fluid into a well on production, where the fluid includes a composition of this invention, which increases an aggregation potential or decreases the absolute value of the zeta potential of any particulate solid in the fluid or that becomes entrained in the fluid to increase solid particle removal and to decrease the potential of the particles to plug the formation and/or the production tubing.

The present invention also provides a method for controlling sand or fines migration including the step of pumping a fluid including a composition of this invention through a matrix at a rate and pressure into a formation to control sand and fine production or migration into the production fluids.

The present invention also provide another method for controlling sand or fines migration including the step of depositing a coated particulate solid material of this invention adjacent screen-type sand and fines control devices so that the sand and/or fines are attracted to the coated particles and do not encounter or foul the screen of the screen-type device.

The aggregating composition of this invention include polymers including repeat units of cyclic or aromatic amines like quinoline or alkyl quinoline, anilines or alkyl anilines, pyrrole or alkyl pyrrole, piperidine or alkyl piperidine, pirrolidine or alkyl pyrrolidine, Imidazole or alkyl imidazole, pyrazine or alkyl pyrazine, pyrimidine or alkyl pyrimidine, quinazoline or alkyl quinazoline.

Basically the difference of this approach to previous art is that this is not based in polyamides or quaternized cyclic and aromatic amines.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
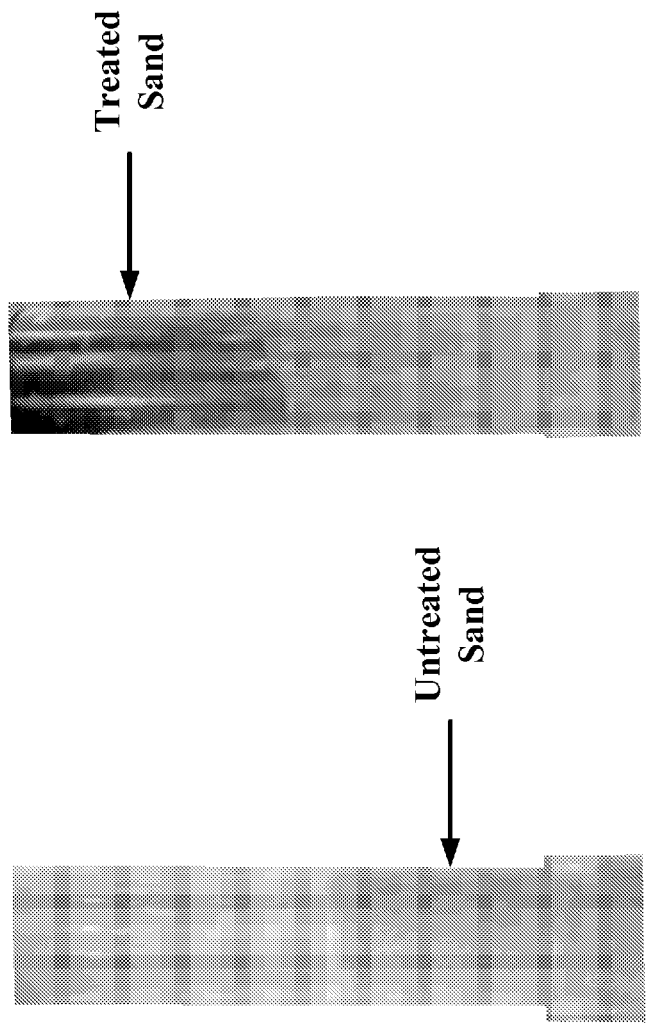
FIG. 1 depicts agglomeration properties of 20/40 sand before treatment and after treatment with a treating fluid including Formulation 1 at a concentration of 6 gal of Formula 1 per 1000 lb of sand.

The inventors have found that a composition can be produced that, when added to a particulate metal-oxide-containing solid or other solid materials or to a suspension or dispersion including a particulate metal-oxide-containing solid or other solid materials, the particles are modified so that an aggregation propensity, aggregation potential and/or a zeta potential of the particles are altered. The inventors have also found that metal-oxide-containing solid particles or other solid particles can be prepared having modified surfaces or portions thereof, where the modified particles have improved aggregation tendencies and/or propensities and/or alter particle zeta potentials. The inventors have also found that the compositions and/or the modified metal-oxide-containing solid or other solid particles can be used in oil field applications including drilling, fracturing, producing, injecting, sand control, or any other downhold application. The inventors have also found that the modified particulate metal-oxide-containing solid particles or particles of any other solid material can be used any other application where increased particle aggregation potentials are desirable or where decreased absolute values of the zeta potential of the particles, which is a measure of aggregation propensity. The inventors have also found that a coated particulate metal-oxide-containing solid compositions can be formed, where the coating is deformable and the coated particles tend to self-aggregate and tend to cling to surfaces having similar coatings or having similar chemical and/or physical properties to that of the coating. That is to say, that the coated particles tend to prefer like compositions, which increase their self-aggregation propensity and increase their ability to adhere to surface that have similar chemical and/or physical properties. The inventors have found that the coating compositions of this invention are distinct from known compositions for modifying particle aggregation propensities and that the coated particles are ideally suited as proppants, where the particles have altered zeta potentials that change the charge on the particles causing them to attract and agglomerate. The change in zeta potential or aggregation propensity causes each particle to have an increased frictional drag keeping the proppant in the fracture. The compositions are also ideally suited for decreasing fines migrating into a fracture pack or to decrease the adverse impact of fines migration into a fractured pack.

The chemical systems of this invention can be used as aggregating reagents mainly to control proppant flow back and fine movement as well as improving gas production and load recovery of fracture and squeeze jobs.

In the case of drilling, the compositions of this invention can be used to coat the formation and formation cuttings during drilling, because the particle tend to self aggregate and/or cling to similar modified formation surfaces. Again, an advantage of the self-aggregation is a reduced tendency of the cuttings to foul or plug screens. Additional advantages are to coat the formation walls with a composition of this invention during drilling to consolidate the formation and to consolidate or aggregate fines or particles in the drilling fluid to keep the rheological properties of the drilling fluid from changing and increasing equivalent circulating density (ECD).

Compositions

The invention broadly relates to a composition including a polymer having repeat units derived from a heterocyclic or heterocyclic aromatic vinyl monomer, where the hetero atom is a nitrogen atom or a nitrogen atom and another hetero atoms selected from the group consisting of a boron atom, an oxygen atom, a phosphorus atom, a sulfur atom, and/or a germanium and optionally a reaction product of an amine and a phosphate-containing compound. The composition modifies surfaces of solid materials or portions thereof altering the chemical and/or physical properties of the surfaces. The altered properties permit the surfaces to become self attracting or to permit the surfaces to be attractive to material having similar chemical and/or physical properties. In the case of particles including metal oxide particles such as particles of silica, alumina, titania, magnesia, zirconia, other metal oxides or oxides including a mixture of these metal oxides (natural or synthetic), the composition forms a complete or partial coating on the surfaces of the particles. The coating can interact with the surface by chemical and/or physical interactions including, without limitation, chemical bonds, hydrogen bonds, electrostatic interactions, dipolar interactions, hyperpolarizability interactions, cohesion, adhesion, adherence, mechanical adhesion or any other chemical and/or physical interaction that allows a coating to form on the particles. The coated particles have a greater aggregation or agglomeration propensity than the uncoated particles. Thus, the particles before treatment may be free flowing, while after coating are not free flowing, but tend to clump, aggregate or agglomerate. In cases, where the composition is used to coat surfaces of a geological formation, a synthetic metal oxide structure and/or metal-oxide containing particles, the particles will not only tend to aggregate together, the particles also will tend to cling to the coated formation or structural surfaces.

Treated Structures and Substrates

The present invention also broadly relates to structures and substrates treated with a composition of this invention, where the structures and substrates include surfaces that are partially or completely coated with a composition of this invention. The structures or substrates can be ceramic or metallic or fibrous. The structures or substrates can be spun such as a glass wool or steel wool or can be honeycombed like catalytic converters or the like that include channels that force fluid to flow through tortured paths so that particles in the fluid are forced in contact with the substrate or structured surfaces. Such structures or substrates are ideally suited as particulate filters or sand control media.

Methods for Treating Particulate Solids

The present invention broadly relates to a method for treating metal oxide-containing surfaces including the step of contacting the metal oxide-containing surface with a composition of this invention. The composition forms a coating on the surface altering the properties of the surface so that the surface is now capable to interacting with similarly treated surfaces to form agglomerated and/or aggregated structures. The treating can be designed to coat continuous metal oxide containing surfaces and/or the surfaces of metal oxide containing particles. If both are treated, then the particles cannot only self-aggregate, but the particles can also aggregate, agglomerate and/or cling to the coated continuous surfaces. The compositions can be used in fracturing fluids, in drilling fluids, in completion fluids, in sand control applications or any other downhole application. Additionally, the coated particles can be used in fracturing fluids. Moreover, structures, screens or filters coated with the compositions of this invention can be used to attract and remove fines that have been modified with the compositions of this invention.

Method for Fracturing and/or Propping

The present invention broadly relates to methods for fracturing a formation including the step of pumping a fracturing fluid including a composition of this invention into a producing formation at a pressure sufficient to fracture the formation. The composition modifies an aggregation potential and/or zeta-potential of formation particles and formation surfaces during fracturing so that the formation particles aggregate and/or cling to the formation surfaces or each other increasing fracturing efficiency and increasing productivity of the fracture formation. The composition of this invention can also be used in a pre-pad step to modify the surfaces of the formation so that during fracturing the formation surfaces are pre-coated. The prepad step involves pumping a fluid into the formation ahead of the treatment to initiate the fracture and to expose the formation face with fluids designed to protect the formation. Beside just using the composition as part of the fracturing fluid, the fracturing fluid can also include particles that have been prior treated with the composition of this invention, where the treated particles act as proppants to prop open the formation after fracturing. If the fracturing fluid also includes the composition, then the coated particle proppant will adhere to formation surfaces to a greater degree than would uncoated particle proppant.

In an alternate embodiment of this invention, the fracturing fluid includes particles coated with a composition of this invention as proppant. In this embodiment, the particles have a greater self-aggregation propensity and will tend to aggregate in locations that may most need to be propped open. In all fracturing applications including proppants coated with or that become coated with the composition of this invention during fracturing, the coated proppants are likely to have improved formation penetration and adherence properties. These greater penetration and adherence or adhesion properties are due not only to a difference in the surface chemistry of the particles relative to the surface chemistry of un-treated particles, but also due to a deformability of the coating itself. Thus, the inventors believe that as the particles are being forced into the formation, the coating will deform to allow the particles to penetrate into a position and as the pressure is removed the particles will tend to remain in place due to the coating interaction with the surface and due to the relaxation of the deformed coating.

Method for Drilling

The present invention also broadly relates to a method for drilling including the step of while drilling, circulating a drilling fluid to provide bit lubrication, heat removal and cutting removal, where the drill fluid includes a composition of this invention, which increases an aggregation potential or decrease an absolute value of the zeta potential of any particulate solids in the drilling fluid or that becomes entrained in the drilling fluid to increase solids removal.

The present invention also broadly relates to a method for drilling including the step of while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition of this invention to provide bit lubrication, heat removal and cutting removal and to increase an aggregation potential or decrease an absolute value of the zeta potential of any solid including particulate metal oxide-containing solids in the drilling fluid or that becomes entrained in the drilling fluid to increase solids removal.

The present invention also broadly relates to a method for drilling including the step of while drilling, circulating a first drilling fluid to provide bit lubrication, heat removal and cutting removal. Upon encountering an underground structure that produces undesirable quantities of particulate solids including metal oxide-containing solids, changing the first drilling fluid for a second drilling fluid including a composition of this invention to provide bit lubrication, heat removal and cutting removal and to increase an aggregation potential or zeta potential of any particulate solid including metal oxide-containing solid in the drilling fluid or that becomes entrained in the drilling fluid to increase solids removal. After passing through the structure that produces an undesired quantities of particulate metal oxide-containing solids, change the second drilling fluid for the first drilling fluid or a third drilling fluid.

Method for Producing

The present invention also broadly relates to a method for producing including the step of circulating and/or pumping a fluid into, where the fluid includes a composition of this invention, which increases an aggregation potential or decreases an absolute value of the zeta potential of any particulate solid including a metal oxide-containing solid in the fluid or that becomes entrained in the fluid to increase solids removal and to decrease the potential of the particles plugging the formation and/or production tubing.

Suitable Agents

Suitable amines include, without limitation, any amine that is capable of reacting with a suitable phosphate containing compound to form a composition that forms a deformable coating on a metal-oxide-containing surface. Exemplary examples of such amines include, without limitation, any amine of the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of amines suitable for use in this invention include, without limitation, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quino line and alkyl quino line or mixture of alkyl quino line, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

Suitable phosphate containing compounds include, without limitation, any phosphate acid and/or any phosphate ester that is capable of reacting with a suitable amine to form a composition that forms a deformable coating on a metal-oxide containing surface or partially or completely coats particulate materials. Exemplary examples of such phosphate esters include, without limitation, any phosphate esters of the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Exemplary examples of phosphate esters include, without limitation, phosphate ester of alkanols having the general formula $P(O)(OH)_x(OR^6)$, where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof. Other exemplary examples of phosphate esters include, without limitation, phosphate esters of alkanol amines having the general formula $N[R^7OP(O)(OH)_2]_3$ where $R^7$ is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof. Other exemplary examples of phosphate esters include, without limitation, phosphate esters of hydroxylated aromatics such as phosphate esters of alkylated phenols such as Nonylphenyl phosphate ester or phenolic phosphate esters. Other exemplary examples of phosphate esters include, without limitation, phosphate esters of diols and polyols such as phosphate esters of ethylene glycol, propylene glycol, or higher glycolic structures. Other exemplary phosphate esters include any phosphate ester than can react with an amine and coated on to a substrate forms a deformable coating enhancing the aggregating potential of the substrate. Exemplary phosphate acids include phosphoric acid, polyphosphoric acid or mixtures thereof.

Suitable solid materials suitable for being coated with the compositions of this invention include, without limitation, metal oxides and/or ceramics, natural or synthetic, metals, plastics and/or other polymeric solids, solid materials derived from plants, or any other solid material that does or may find use in downhole applications or mixtures or combinations thereof. Metal oxides including any solid oxide of a metallic element of the periodic table of elements. Exemplary examples of metal oxides and ceramics include actinium oxides, aluminum oxides, antimony oxides, boron oxides, barium oxides, bismuth oxides, calcium oxides, cerium oxides, cobalt oxides, chromium oxides, cesium oxides, copper oxides, dysprosium oxides, erbium oxides, europium oxides, gallium oxides, germanium oxides, iridium oxides, iron oxides, lanthanum oxides, lithium oxides, magnesium oxides, manganese oxides, molybdenum oxides, niobium oxides, neodymium oxides, nickel oxides, osmium oxides, palladium oxides, potassium oxides, promethium oxides, praseodymium oxides, platinum oxides, rubidium oxides, rhenium oxides, rhodium oxides, ruthenium oxides, scandium oxides, selenium oxides, silicon oxides, samarium oxides, silver oxides, sodium oxides, strontium oxides, tantalum oxides, terbium oxides, tellurium oxides, thorium oxides, tin oxides, titanium oxides, thallium oxides, thulium oxides, vanadium oxides, tungsten oxides, yttrium oxides, ytterbium oxides, zinc oxides, zirconium oxides, ceramic structures prepared from one or more of these oxides and mixed metal oxides including two or more of the above listed metal oxides. Exemplary examples of plant materials include, without limitation, shells of seed bearing plants such as walnut shells, pecan shells, peanut shells, shells for other hard shelled seed forming plants, ground wood or other fibrous cellulosic materials, or mixtures or combinations thereof.

Suitable polymers for use in the compositions of this invention includes, without limitation, any polymer including repeat units derived from a heterocyclic or heterocyclic aromatic vinyl monomer, where the hetero atoms is a nitrogen atom or a combination of a nitrogen atom and another hetero atoms selected from the group consisting of boron, oxygen, phosphorus, sulfur, germanium, and/or mixtures thereof. The polymers can be homopolymers of cyclic or aromatic nitrogen-containing vinyl monomers, or copolymers of any ethylenically unsaturated monomers that will copolymerize with a cyclic or aromatic nitrogen-containing vinyl monomer. Exemplary cyclic or aromatic nitrogen-containing vinyl monomers include, without limitation, vinyl pyrroles, substituted vinyl pyrroles, vinyl pyridines, substituted vinyl pyridines, vinyl quinolines or substituted vinyl quinolines, vinyl anilines or substituted vinyl anilines, vinyl piperidines or substituted vinyl piperidines, vinyl pyrrolidines or substituted vinyl pyrrolidines, vinyl imidazole or substituted vinyl imidazole, vinyl pyrazine or substituted vinyl pyrazines, vinyl pyrimidine or substituted vinyl pyrimidine, vinyl quinazoline or substituted vinyl quinazoline, or mixtures or combinations thereof. Exemplary pyridine monomer include 2-vinyl pyridine, 4-vinyl pyridine, or mixtures or combinations thereof. Exemplary homopolymers include poly-2-vinyl pyridine, poly-4-vinyl pyridine, and mixtures or combinations thereof. Exemplary copolymers including copolymers or 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures of combinations thereof. All of these monomers can also includes substituents. Moreover, in all these vinyl monomers or ethylenically unsaturated monomers, one or more of the carbon atoms can be replaced by one or more hetero atoms selected from the group consisting of boron, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof. Of course, all of these monomers includes at least one nitrogen atom in the structure.

EXPERIMENTS OF THE INVENTION

Purpose

We have evaluated sand aggregation and gas regain permeability in core flooding tests of formulation 1 due changes in the Zeta Potential.

Formulation 1
Ingredients and Weight Percentages for Formulation 1

| Components | wt. % |
| --- | --- |
| PAP-220† | 44.72 |
| Phosphate Ester‡ | 4.87 |
| Methanol | 40.41 |
| Reilline 410* | 10.00 |

†Mixture of alkyl pyridines available from Vertellus
‡Reaction product of 78.50 wt. % polyphosphoric acid and 21.50 wt. % tri-ethanol amine
*Mixture of poly 4 vinyl pyridine available from Vertellus Procedure
Agglomeration Properties Treated and un-treated sand were tested by mixing 250 grams of 20/40 Badger sand in slurries with concentrations of 6 gal of Formulation 1 per 1000 lb of sand.

The sand was rinsed three times and poured into a clear PVC plastic cylinder.

Core Flooding Tests

Core tests were conducted in Berea Sand Stone cores of permeability to $N_2$ of 50-55 mD. The core same was 1.5 inches diameter and 3.5 inches long.

The tests were started by measuring permeability to brine at a flow rate of 120 cc/min until 5 porous volume were collected and checking the Darcy Flow regime.

Flow of nitrogen was started with a differential pressure of 10 psi recording liquid collected in the other end of the core as well as gas flow rate for two hours.

Liquid saturation was then reestablished, when injecting 5 porous volume of the treated brine with the load recovering agent.

Flow of nitrogen was then re-started with a differential pressure of 10 psi measuring collected liquid and gas flow rate in the other end of the core.

In all the tests, the overburden pressure was set in the radial and axial direction of 1000 psi and the temperature at 70° F.

Results

Referring FIG. 1 compares the agglomeration properties of 20/40 sand before treated and after treated with formulation 1 using 6 gal of treating system per 1000 lb of. In this case, it can be clearly observed that treated sand did not fall when turned the plastic cylinder down.

Figure 2:
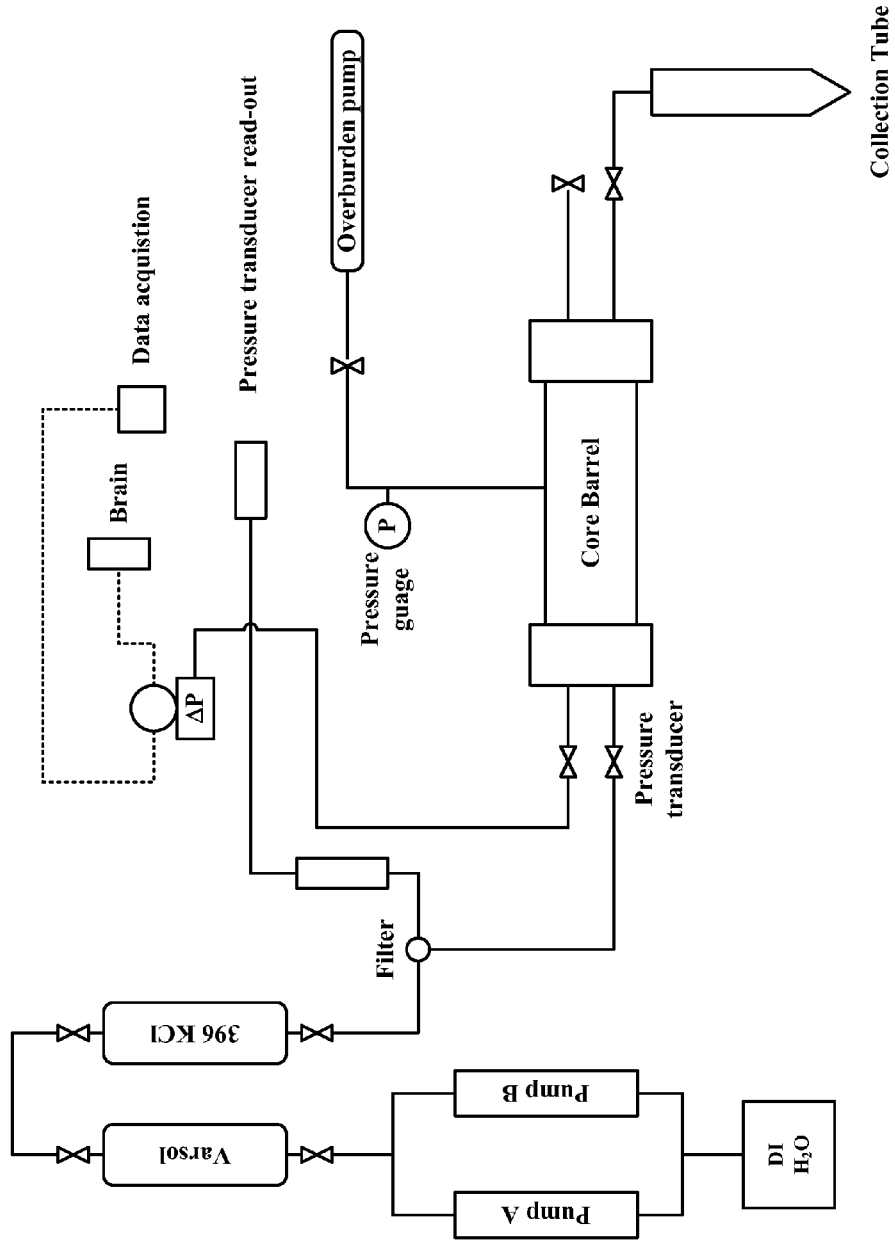
FIG. 2 depicts a diagram of a liquid permeability apparatus used in this invention.
Figure 3:
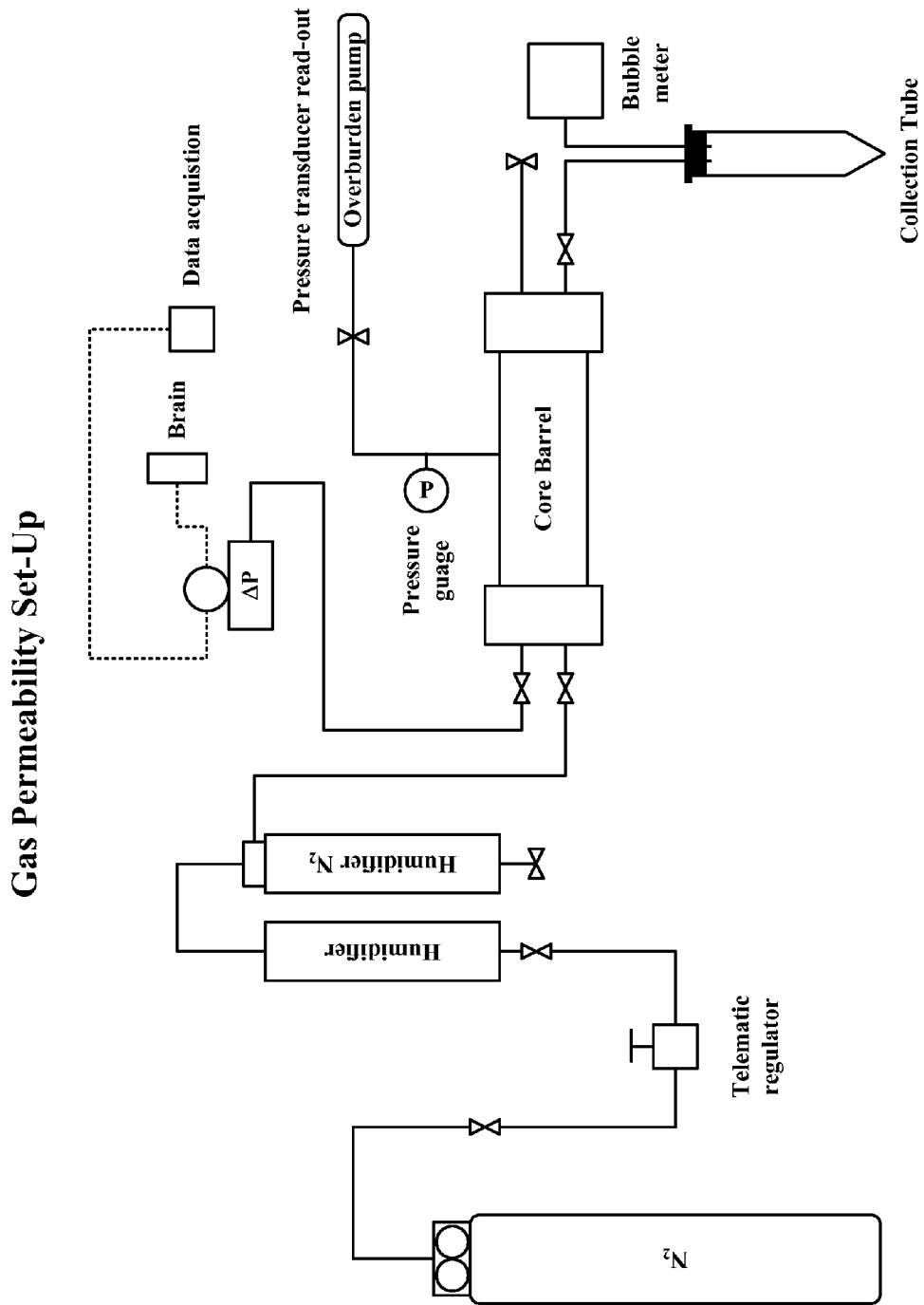
FIG. 3 depicts a diagram of a gas permeability apparatus used in this invention.

Referring to FIG. 2, a diagram of Core Test Apparatus for determining liquid permeability is shown, while FIG. 3, a diagram of Core Test Apparatus for determining gas permeability.

Figure 4:
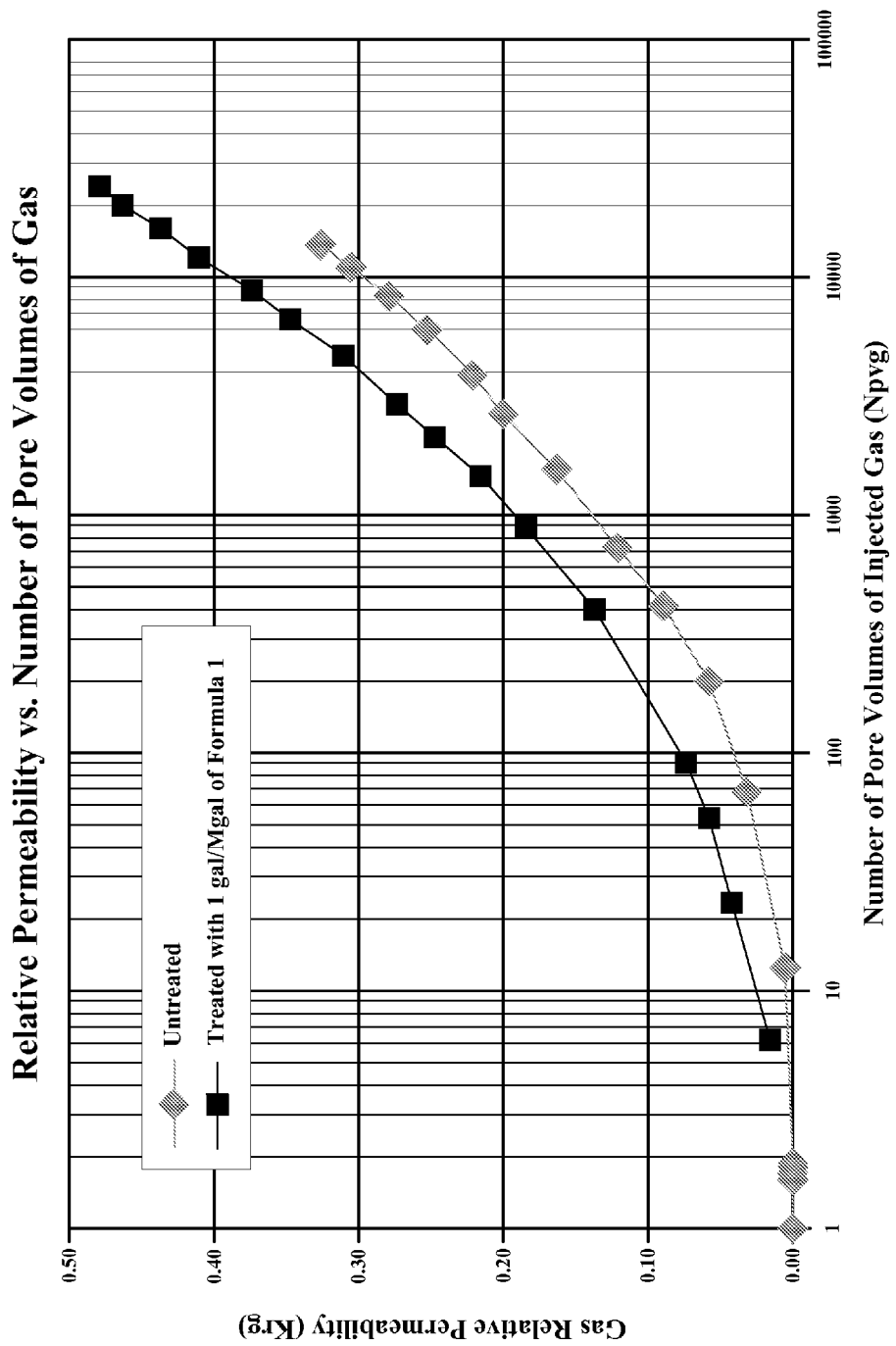
FIG. 4 depicts a plot of relative permeability versus number of porous volumes of gas for treating composition.

Referring FIG. 4 compares the agglomeration properties of 20/40 sand before treated and after treated with formulation 1 using 6 gal of treating system per 1000 lb of. In this case it can be clearly observed that treated sand did not fall when turned the plastic cylinder down.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for fracturing a formation comprising the step of:
    pumping a fracturing fluid including a proppant into a producing formation at a pressure sufficient to fracture the formation and to enhance productivity, where the proppant props open the formation after fracturing and where the proppant comprises a particulate solid treated with a treating composition comprising a polymer comprising homopolymers selected from the group consisting of poly-2-vinyl pyridine, poly-4-vinyl pyridine, and mixtures or combinations thereof and copolymers selected from the group consisting of copolymers of 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures or combinations thereof, and where the treating composition increases an aggregating propensity or self-aggregating properties of the proppant or decreases an absolute value of a zeta potential of the proppant increasing the ability for the proppant to adhere to formation surfaces keeping the proppant in the fractures formed in the formation.

2. The method of claim 1, wherein the composition forms a partial or complete coating on surfaces of the particulate solid material.

3. The method of claim 1, wherein the composition further comprises a reaction product of an amine and a phosphate-containing compound.

4. The method of claim 3, wherein the composition forms a partial or complete coating on surfaces of the particulate solid material.

5. A method for fracturing a formation comprising the step of:
    pumping a fracturing fluid; and
    pumping a proppant comprising a coated particulate solid composition treated with a treating composition including a polymer comprising homopolymers selected from the group consisting of poly-2-vinyl pyridine, poly-4-vinyl pyridine, and mixtures or combinations thereof and copolymers selected from the group consisting of copolymers of 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures or combinations thereof and optionally a reaction product of an amine and a phosphate-containing compound, which forms a partial or complete coating on surfaces of particulate solid material and where the treating composition increases an aggregating propensity or aggregating properties of the proppant or decreases an absolute value of a zeta potential of the proppant, where the coated particles prop open the fractured formation and tend to aggregate or adhere to the formation surfaces and/or formation particles formed during fracturing to enhance formation productivity.

6. The method of claim 5, wherein the fracturing fluid includes an aggregating composition including a polymer comprising homopolymers selected from the group consisting of poly-2-vinyl pyridine, poly-4-vinyl pyridine, and mixtures or combinations thereof and copolymers selected from the group consisting of copolymers of 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures or combinations thereof and optionally a reaction product of an amine and a phosphate-containing compound, where the aggregating composition coats surfaces of the formation and formation particulate generated before, during and after fracturing to change a zeta potential or aggregation potential of the surfaces or formation particulate so that the formation particulate and proppant tend to adhere to the treated formation surfaces.

7. The method of claim 5, further comprising the step of:
pre-treating the formation with an aggregating composition including a polymer comprising homopolymers selected from the group consisting of poly-2-vinyl pyridine, poly-4-vinyl pyridine, and mixtures or combinations thereof and copolymers selected from the group consisting of copolymers of 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures or combinations thereof and optionally a reaction product of an amine and a phosphate-containing compound, where the aggregating composition coats surfaces of the formation prior to fracturing to change a zeta potential or aggregation potential of the surfaces and formation particulate formed during fracturing so that the formation particulate and proppant tend to adhere to the treated formation surfaces.

8. A method for producing comprising the step of:
circulating and/or pumping a fluid into a well on production, where the fluid includes an aggregating composition comprising a polymer comprising homopolymers selected from the group consisting of poly-2-vinyl pyridine, poly-4-vinyl pyridine, and mixtures or combinations thereof and copolymers selected from the group consisting of copolymers of 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures or combinations thereof and optionally a reaction product of an amine and a phosphate-containing compound to provide bit lubrication, heat removal and cutting removal and to increase an aggregation potential or decrease an absolute value of a zeta potential of any particulate solids in the fluid or that becomes entrained in the fluid to increase solid particle removal and to decrease the potential of the particles to plug the formation and/or the production tubing.

9. The method of claim 8, wherein the composition is present in an amount sufficient to control sand and fine production or migration into the production fluids.

10. The method of claim 8, further comprising the step of:
depositing a coated particulate solid material treated with a treating composition comprising a polymer comprising homopolymers selected from the group consisting of poly-2-vinyl pyridine, poly-4-vinyl pyridine, and mixtures or combinations thereof and copolymers selected from the group consisting of copolymers of 2-vinyl pyridine and 4-vinyl pyridine, copolymers of ethylene and 2-vinyl pyridine and/or 4-vinyl pyridine, copolymers of propylene and 2-vinyl pyridine and/or 4-vinyl pyridine, copolymers of acrylic acid and 2-vinyl pyridine and/or 4-vinyl pyridine, copolymers of methacrylic acid and 2-vinyl pyridine and/or 4-vinyl pyridine, copolymers of acrylates and 2-vinyl pyridine and/or 4-vinyl pyridine, copolymers of methacrylates and 2-vinyl pyridine and/or 4-vinyl pyridine, and mixtures or combinations thereof and optionally a reaction product of an amine and a phosphate-containing compound forming a partial or complete coating on surfaces of particulate solid material adjacent screen-type sand and fines control devices, where the treating composition increases an aggregating propensity or aggregating properties of the particulate solid material or decreases an absolute value of a zeta potential of the particulate solid material so that the sand and/or fines are attracted to and adhere to the coated particulate solid material and do not encounter or foul the screen of the screen-type device.

11. The method of claim 4, wherein
the amine comprises amines having the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and
the phosphate-containing compound comprises phosphate acids and esters having the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof or polymeric forms thereof.

12. The method of claim 11, wherein
the amine is selected from the group consisting of aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

13. The method of claim 11, wherein the phosphate-containing compound comprises phosphate esters of alkanols having the general formula $P(O)(OH)_x(OR^6)_y$ where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof.

14. The method of claim 11, wherein the phosphate-containing compound comprises phosphate esters of alkanol amines having the general formula $N[R^7OP(O)(OH)_2]_3$ where $R^7$ is a carbenzyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof.

15. The method of claim 5, wherein
the amine comprises amines having the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and
the phosphate-containing compound comprises phosphate acids and esters having the general formula $P(O)(OR^3)$ $(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof or polymeric forms thereof.

16. The method of claim 15, wherein
the amine is selected from the group consisting of aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

17. The method of claim 15, wherein the phosphate-containing compound comprises phosphate esters of alkanols having the general formula $P(O)(OH)_x(OR^6)_y$ where x+y=3 and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof.

18. The method of claim 15, wherein the phosphate-containing compound comprises phosphate esters of alkanol amines having the general formula $N[R^7OP(O)(OH)_2]_3$ where $R^7$ is a carbenzyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof.

19. The method of claim 8, wherein
the amine comprises amines having the general formula $R^1,R^2NH$ or mixtures or combinations thereof, where $R^1$ and $R^2$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof and the phosphate-containing compound comprises phosphate acids and esters having the general formula $P(O)(OR^3)(OR^4)(OR^5)$ or mixture or combinations thereof, where $R^3$, $R^4$, and $OR^5$ are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof or polymeric forms thereof.

20. The method of claim 19, wherein the amine is selected from the group consisting of aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixture of alkyl indoles, imidazole and alkyl imidazole or mixtures of alkyl imidazole, quinoline and alkyl quinoline or mixture of alkyl quinoline, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, or mixtures or combinations thereof.

21. The method of claim 19, wherein the phosphate-containing compound comprises phosphate esters of alkanols having the general formula $P(O)(OH)_x(OR^6)_y$ where $x+y=3$ and are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates or mixtures or combinations thereof.

22. The method of claim 19, wherein the phosphate-containing compound comprises phosphate esters of alkanol amines having the general formula $N[R^7OP(O)(OH)_2]_3$ where $R^7$ is a carbenzyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur or mixture or combinations thereof and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine or mixtures or combinations thereof.

* * * * *